Feb. 19, 1929.
R. V. MORSE
1,702,306
AIRPLANE
Filed Dec. 3, 1927
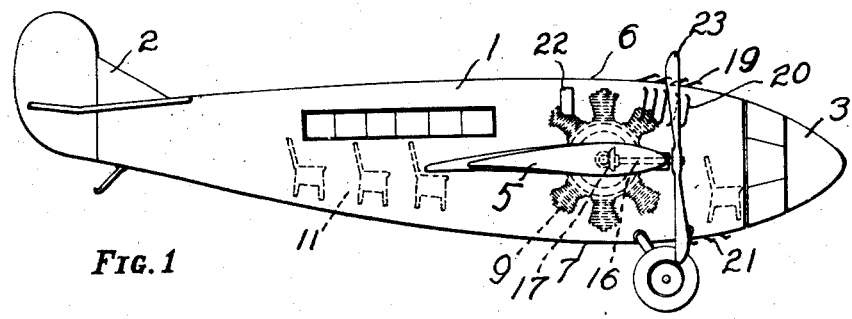
FIG. 1
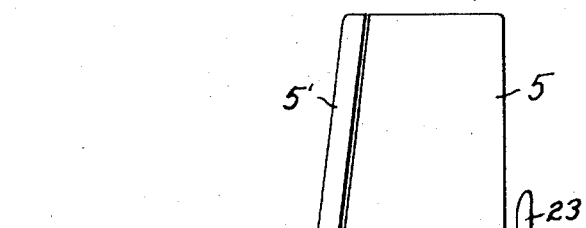
FIG. 2
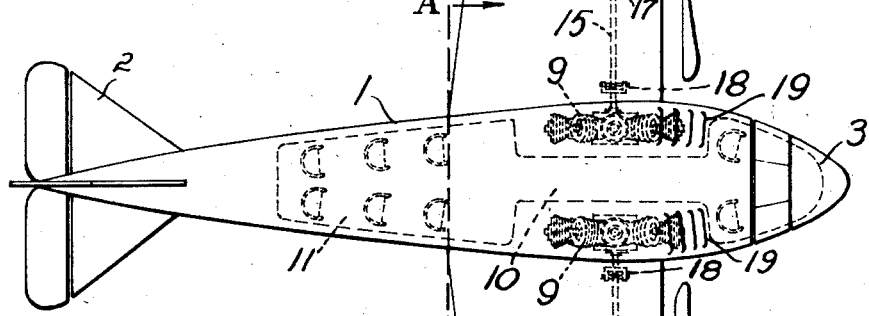
FIG. 3
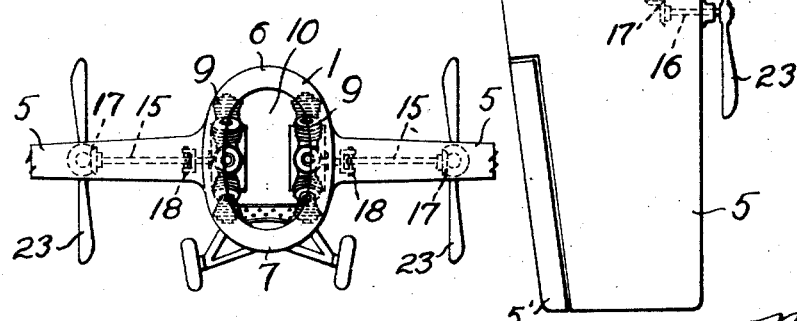
INVENTOR.
Robert V. Morse Patented Feb. 19, 1929.

1,702,306

UNITED STATES PATENT OFFICE.

ROBERT V. MORSE, OF ITHACA, NEW YORK.

AIRPLANE.

Application filed December 3, 1927. Serial No. 237,481.

This invention relates to airplanes and is in general directed toward making them safer, faster, and more practical for general use than has heretofore been the case. One object of the invention is to increase the speed by reducing the head resistance to the passage of the airplane thru the air. Another object is to increase the safety and reliability of the airplane by using more than one motor, and making them readily accessible for inspection during flight. Another object is to increase the ease of handling by locating the heavier motor weights near the center of gravity of the airplane. A further object is to drive the propellers more efficiently and lighten the motors by permitting higher rotative speeds. All these objects are desirable, and have been sought in various forms. But owing to the strict limitations of weight, size, handling, etc. imposed by the nature of the airplane problem, it is of little avail to accomplish any one of the objects if it is at the expense of the rest. For example, it is of little avail to use multiple motors if one also multiplies the head resistance; or to use multiple motors for reliability if they are not accessible; or to have them accessible if the arrangement creates such power losses to the propellers that the machine will not fly satisfactorily. The primary object, therefore, of the present invention is to obtain the combination which will produce for each of the objects the maximum accomplishment consistant with a similar degree of accomplishment of the various other objects, so as to produce the airplane which as a whole will be most effective. This primary object may be stated as an attempt to arrive at the combination which will give the maximum amount of power with a minimum of air resistance, without sacrificing accessibility during flight or impairing the handling qualities of the airplane.

Referring now to the drawings, Fig. 1 is a side view of an airplane illustrating the invention; Fig. 2 is a plan view of the same; and Fig. 3 is a vertical cross-sectional view taken on the line A—A of Fig. 2 looking in the direction of the arrows. Similar reference numerals refer to similar parts thruout the various views.

The invention is illustrated in connection with a monoplane, but is equally applicable to a biplane or triplane, or to an airplane with wings in tandem, as will be described. The airplane has an enclosed fuselage or body 1 which is smoothly streamlined both fore and aft and terminates in a tail 2 equipped with the usual vertical and horizontal rudders and control surfaces. The forward end 3 of the body is preferably covered largely with transparent material so that the pilot may have clear vision thruout a wide-angle.

The wings 5—5 are attached to the body 1 about half way between the top of the body 6 and the bottom of the body 7, for reasons that will appear. The wings 5—5 are preferably wholly or largely of the thick-wing, internally braced type, though external braces may be used if desired. These wings usually involve a strong I beam or equally rigid structure which may be utilized to support the bearings of the propeller gearing, as will be described. The wings 5—5 have ailerons 5'—5' operated by controls in the usual manner.

Mounted in the body 1 of the airplane are two motors 9—9, separated by a corridor 10 which runs lengthwise between them thru the body of the airplane and connects the pilot's quarters in the nose 3 of the airplane with the passenger or load carrying portion of the body 11 to the rear of the motors. This passage or engine room 10 is also shown in Fig. 3 between the motors 9—9.

The motors 9—9 are of the radial or star type, having a large number of cylinders extending in various directions and lying substantially in one or two parallel planes, so that they have short crankshafts and the diameter of the motor as a whole is much greater than its length. These motors are placed edgewise in the hull or body 1, so that their planes are substantially parallel to the direction of motion of the airplane; in other words the motors 9—9 are positioned so as to travel edgewise thru the air. This arrangement also spreads the motors 9—9 on each side wall of the engine room or passage 10, so that all the cylinders are readily accessible to a man in the passage 10.

The thickness of the motors plus the width of the passage 10 for the man normally brings the thickness of the body 1 at this point to about the right amount to correspond to a double pilot control in front and a double row of chairs to the rear without disturbing the streamline characteristics of the body. The inter-relations of these proportions is important, as the speed of the airplane is as much a function of its air resistance as it is a function of its power. The speed of an airplane may be considered as the effective power divided by the air resistance, and the arrangement described is favorable to a high value of this ratio. This is principally due to the use of multiple radial motors placed edgewise; and to further reduce the head resistance the top of the body 6 and the bottom of the body 7 are carried as close to the top and the bottom edge of the motors 9—9 as is feasible with reasonable working clearance, and the height of the pilot's and passenger's compartments is proportioned accordingly, having due regard to stream-lining. The purpose is to produce a body which for a given amount of power will pass thru the air with a minimum amount of resistance. The relative heights of airplane motors of the radial type and the human body make the above arrangement feasible.

The above arrangement requires gearing to deliver the motor power to the propellers 23, due to the fact that the motor crankshaft is transverse to the direction of motion of the airplane. But the disadvantages of gearing are minimized by two considerations; (1) there is only one set of gears required in each transmission, that is, the geared power only has to turn one corner instead of two, and (2) the use of gearing permits the motors to run faster than the propellers, thus permitting lighter motors for the same horsepower and more efficient propellers. Spiral bevel gears or gears of the hypoid type are preferable and should be run with ample lubrication which can be observed from the engine room. The drive shafts 15 and propeller shafts 16 are connected thru the gearing 17, and mounted within the structure of the wings 5—5 by suitable bearings attached to the main wing beams or other rigid portions of the internal wing structure. The drive shafts 15 are connected to their respective motors 9 by universal joints 18, which may be of the all metal, or fiber or flexible disk type; these relieve the drive shafts 15 from bending stresses which may occur under flying conditions due to slight flexure of the wing structure. The angle between the drive shaft 15 and propeller shaft 16 need not be exactly 90°, but is normally substantially a right angle.

The motors 9—9 may be water-cooled or air-cooled. If water cooled the radiators should be along the hull of the body 1 or of the wing radiator type, so as not to lose the advantages of minimum air resistance obtained by this type of construction. With air cooled motors airpassages are provided in the forward body, and may either be in the top as at 19, the sides as at 20, or the bottom as at 21, or any or all in combination. These may be in the form of louvres or large holes or other suitable orifices, conducting to cylinders which should preferably be jacketed as is customary in automobile engines of the air cooled type, but in any case the external openings should make no unnecessary projections so as not to disturb the streamlining of the body 1, as the reduction of head resistance is most important to offset the gearing losses. I have referred to motors of the radial type. It will be understood that this includes motors of the double-radial, or multiple-radial type, as well as the single radial type, that is, there may be more than one bank of radial cylinders driving the same crankshaft, provided that the length along the crank shaft is less than the diameter of the motor structure.

The air cooling arrangements above described function chiefly by virtue of the air stream around the body 1 when the airplane is in flight. In order to supply the cooling systems with a moderate amount of air from the propellers when the airplane is on the ground warming up, ventilating holes 22 are also provided further back on the body 1, so as to meet the propeller blast, and may be opened or closed if desired in the manner of dash ventilators such as are used on automobiles for example.

While the invention has been described in connection with a monoplane, it will be understood that it may equally as well be applied to a biplane or triplane, by mounting additional wings above the wings shown, for example. In that case, however, the wings such as have been described, which project from the body and carry the propeller gearing, will usually be thicker than the wings used merely as supporting surfaces in flying.

In the foregoing the invention has been described in one preferred embodiment thereof, but it will be understood that this is merely for purposes of illustration, and that it is susceptible to various modifications and adaptations in different installations as will be apparent to those skilled in the art without departing from the scope of the invention as defined in the following claims.

1. In an airplane, the combination of a body, wings, control surfaces, a pair of motors of the radial type mounted in the body on either side thereof, so as to leave a passage-way in between, the plane of greatest dimension of the motor extending substantially in the same direction as the direction of motion of the airplane and the axes of the motors extending transversely to the direction of motion of the airplane, propellers mounted on the wings, propeller shaft connected to said propellers, drive shafts connected to said motors, the propeller shafts being at an angle to the drive shafts, and gearing between the drive shafts and the propeller shafts.

2. In an airplane, the combination of a body, a pair of motors of the radial type mounted edgewise in relation to the direction of flow of the air stream around said body, the axes of said motors being transverse to the direction of said air stream, wings extending out from said body at points substantially midway between the top and bottom thereof, propellers mounted on said wings, propeller shafts connected to said propellers, drive shafts connected to said motors, and gearing between the drive shafts and the propeller shafts.

3. In an airplane, the combination of a pair of wings, a body attached to said wings, said body being streamlined and tapering forward from the wings and rearward from the wings, the top of said body being substantially as far above the said wings as the bottom of the body is below them, the forward end of said body having a pilot's compartment, the rearward portion having a load carrying compartment, radial motors spread upon the walls of said body on either side thereof so as to leave a passageway in between connecting the pilot's compartment with the load carrying compartment, the axes of said motors extending transversely to the line of flight of the airplane, drive shafts connected to said motors, propellers mounted on said wings, propeller shafts connected to said propellers, and gearing between the drive shafts and the propeller shafts.

4. In an airplane, the combination of a body, radial motors on the sides of said body with a passageway in between, the axes of said motors extending transversely to the direction of flight of the airplane, wings extending out from the body substantially on a line with the axes of the radial motors, propellers mounted on the wings, propeller shafts connected to the propellers, drive shafts, universal joints connecting the drive shafts to their respective motors, and gearing connecting the drive shafts to their respective propeller shafts.

5. In an airplane, the combination of a body, radial motors on the sides of the body with a passageway in between, the axes of said motors extending transversely to the direction of flight of the airplane, wings extending out from the body substantially on a line with the axes of the radial motors, propellers mounted on the wings, propeller shafts connected to the propellers, drive shafts connected to the motors, and a single reduction gearing between each motor and its respective propeller.

6. In an airplane, the combination of a body, radial motors on the sides of the body with a passageway in between, the axes of said motors extending transversely to the direction of flight of the airplane, the said body extending forward of said passageway to form a pilot's compartment and extending rearward of said passageway to form a load carrying compartment, wings extending out from the body substantially on a level with the axes of said motors, propellers mounted on said wings, propeller shafts connected to said propellers, drive shafts at an angle to said propeller shafts, universal joints connecting the drive shafts to their resepective motors, and a single gearing between each drive shaft and its respective propeller shaft.

In witness whereof I have hereunto set my hand this 29th day of November, 1927.

ROBERT V. MORSE.